Oct. 26, 1948.                B. VOLKERY ET AL                2,452,406
                        TWO-PART, SCREW-CONNECTED CLAMP
                             Filed Dec. 2, 1947
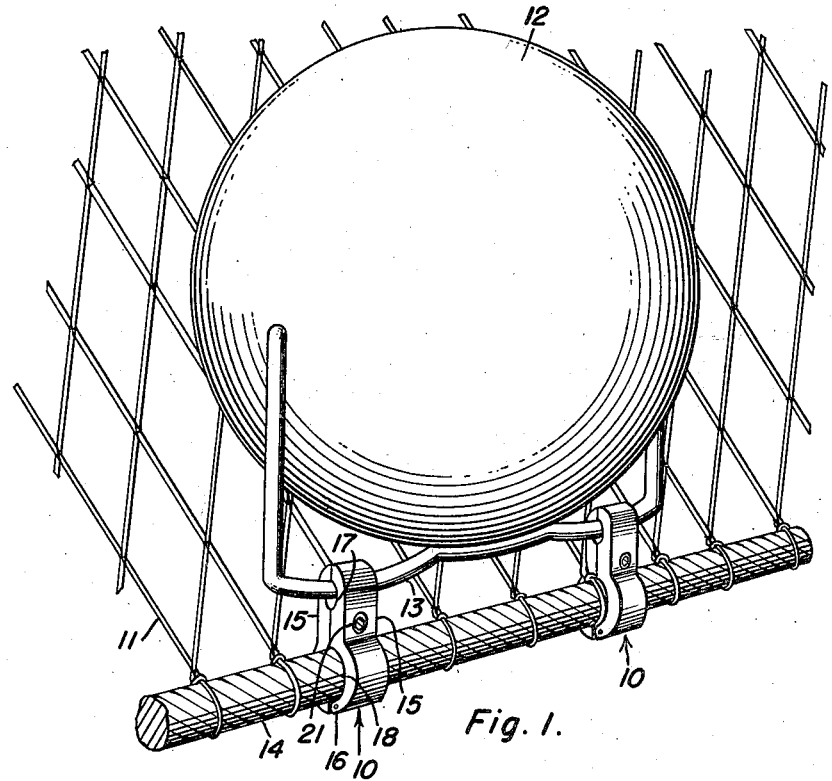
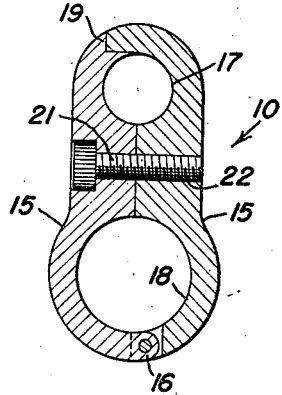
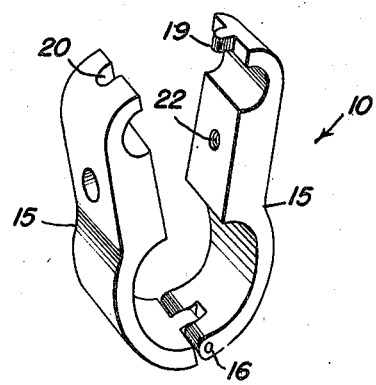
Bernhard Volkery
John Koslowski
            INVENTORS Patented Oct. 26, 1948

2,452,406

UNITED STATES PATENT OFFICE 2,452,406

TWO-PART, SCREW-CONNECTED CLAMP

Bernhard Volkery and John Koslowski,
Shrub Oak, N. Y.

Application December 2, 1947, Serial No. 789,184

2 Claims. (Cl. 24—81)

1

This invention relates to new and useful improvements and structural refinements in clamps, and the principal object of the invention is to provide a device of the character herein described, such as may be conveniently and effectively employed for releasably securing fishing nets to their supporting buoys.

A further object of the invention is to provide a clamp which, in addition to its primary purpose above outlined, may also be used for releasably securing together cables, wires, ropes, and the like.

Another object of the invention is to provide a clamp which is simple in construction, which will readily lend itself to economical manufacture, which will not easily become damaged, and which is otherwise well adapted for the various purposes which it may be used.

With the above more important objects in view and such other objects as may become apparent as this specification proceeds, the invention consists essentially of the construction and arrangement of parts as shown in the accompanying drawings in which:

Figure 1 is a perspective view of a fishing net and buoy, showing the invention in association therewith;

Figure 2 is a cross sectional view of the invention per se, the same being illustrated in a closed position, and Figure 3 is a perspective view of the invention per se, shown in an open position.

Like characters of reference are used to designate like parts in the specification and throughout the several views.

Referring now to the accompanying drawings in detail, the invention consists of a clamp designated generally by the reference character 10, the same being primarily intended for releasably attaching a fishing net 11 to its supporting buoy 12.

These buoys usually assume the form of a buoyant sphere to which is rigidly secured a substantially U-shaped fastening rod 13, while the fishing net 11 is usually provided at the edges thereof with a heavy rope or cable 14, the conventional practice being to secure the fishing net to the buoy by employing wire or cable and tying the rod 13 to the rope 14. However, considerable difficulty is frequently experienced in the fastening rope or cable becoming entangled with the fishing net so that the net does not freely hang from the buoy.

It is for the purpose of eliminating this disadvantage that the invention is primarily in-

2 tended, the clamps 10 (one, two or more), being used to replace the conventional fastening rope or cable in securing the buoy to the fishing net.

The clamp 10 embodies in its construction a pair of complementary half-sections 15 which are hingedly connected together by means of a pin 16 and are adapted for mutual abutment. The opposing surfaces of the half-sections 15 are formed with complementary recesses which define circular openings or bores 17, 18 when the two half-sections are in abutment, as will be clearly understood.

Means are provided for preventing lateral displacement of the half-sections in their abutted position, said means consisting of a projecting tongue 19 with which one of the half-sections is formed and which engages a suitable recess or notch 20 provided in the other half-section. Accordingly, when the tongue 19 engages the notch 20, the half-sections will be effectively prevented from shifting laterally, as will be clearly apparent.

Means are also provided for releasably retaining the half-sections 15 in an abutting relation, said means consisting of a clamping screw 21 which is freely rotatable in one half-section and operatively engages a screw-threaded bore 22 in the second half-section, the half-sections, of course, being drawn together when the screw is tightened, and vice versa.

It will be recognized that a very useful function of the cooperating tongue 19 and recess 20 is to align the hole or bore 22 with the hole or bore in the other half-section 15 immediately and automatically when the two half-sections are swung together with their intermediate shoulders in abutment and with the openings 17 and 18 completed to full circularity around the ropes, rods or the like that are to be connected together by the clamp. Thus the tongue and recess cooperate with the screw and its openings or holes by eliminating the time and effort that would otherwise be required, particularly if the hinge pin 16 is somewhat loose or worn, to align the screw openings or the screw and the threaded opening 22. The aggregate of time saved in making all the buoy connections for a large net is considerable.

When the invention is placed in use, the clamp 10 is simply opened as shown in Figure 3, so as to facilitate insertion of the fish net rope 14 into the opening 18, while at the same time the rod 13 of the buoy 12 is inserted in the opening 17. Thereupon the clamp may be closed, which of course is accomplished by drawing the half-sections 15 together by means of the clamping screw 21.

An important adavantage of locating the tongue 19 and recess or groove 20 at the extreme ends of the respective half-sections opposite the hinged ends thereof is that the tongue cooperates with the grooved half-section to keep the opening or recess 17 sufficiently closed to prevent loss of the rod 13 if the screw means 21 or other elongated fastening element should become loose and permit the half-sections to hinge open to an angularly parted relation. This function of the tongue and its cooperating groove is particularly useful because it enables the device to be made cheaply by mass production methods which tend to result in a product which is apt to become loose during use or following wear or abuse, and because it greatly increases the range of rod diameters which can safely be kept captive in the recess 17. Thus, a rod 13 of quite small diameter will be held by the projecting tongue 19 safely in the recess 17 even when the recess is open to a degree which would, in the absence of the tongue, pass such a rod.

It is believed that the advantages and use of the invention will be clearly apparent from the foregoing disclosure and accordingly further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A clamp comprising a pair of half-sections hingedly connected together at one end and each including in its intermediate portion an inwardly projecting shoulder and including an inwardly opening recess at each terminal portion, screw means penetrating holes in the shoulders and cooperating therewith for releasably holding the shoulders in mutually abutting relation so that each opposed pair of recesses forms a substantially closed opening adapted to hold a rod, rope or the like, in combination with a cooperating tongue and groove provided on the extreme ends of the respective half-sections opposite the hinged ends thereof for interfitting to align the holes to receive the screw means and prevent lateral displacement of the half-sections and for assisting in maintaining the adjacent recess sufficiently closed to prevent loss of the contained rod, rope or the like upon the screw means becoming loose and the half-sections hinging to angularly parted relation.

2. A clamp comprising a pair of half-sections hingedly connected together at one end and each including in its intermediate portion an inwardly projecting shoulder and including an inwardly opening recess at each terminal portion, an elongated fastening element penetrating holes in the shoulders and cooperating therewith for releasably holding the shoulders in mutually abutting relation so that each opposed pair of recesses forms a substantially closed opening adapted to hold a rod, rope or the like, in combination with a cooperating tongue and groove provided on the extreme ends of the respecitve half-sections opposite the hinged ends thereof for interfitting to align the holes to receive the elongated fastening element and prevent lateral displacement of the half-sections and for assisting in maintaining the adjacent recess sufficiently closed to prevent loss of the contained rod, rope or the like upon the fastening element becoming loose and the half-sections hinging to angularly parted relation.

BERNHARD VOLKERY.
JOHN KOSLOWSKI.

REFERENCES CITED

The following references are of record in the file of this patent:

UNITED STATES PATENTS

| Number | Name | Date |
|---|---|---|
| 2,014,634 | Polgov | Sept. 17, 1935 |
| 2,185,723 | Buckner | Jan. 2, 1940 |